Dec. 29, 1959  G. E. CROSBY ET AL  2,919,363
ACTIVATED ALUMINA-DOMINATED PHOSPHORS
Filed Oct. 3, 1955

INVENTORS
GILMORE E. CROSBY,
ARTHUR L. SMITH &
LAVERNE E. WHITMER

BY

ATTORNEY

United States Patent Office 2,919,363
Patented Dec. 29, 1959

2,919,363

ACTIVATED ALUMINA-DOMINATED PHOSPHORS

Gilmore E. Crosby, Arthur L. Smith, and La Verne E. Whitmer, Lancaster, Pa., assignors to Radio Corporation of America, a corporation of Delaware Application October 3, 1955, Serial No. 538,039

14 Claims. (Cl. 313—92)

This invention relates generally to improved luminescent materials also known as phosphors, and particularly, but not necessarily exclusively, to improved phosphors comprising alumina-dominated host crystals and an activator incorporated therein, to methods for preparing said improved phosphors and to luminescent screens and cathode ray tubes including said improved phosphors.

An alumina-dominated phosphor is a phosphor wherein the host crystal thereof comprises alumina or alumina in chemical combination with a metal oxide. Activated alumina-dominated phosphors, such as chromium activated alumina, manganese activated zinc aluminate and chromium activated magnesium aluminate have been reported previously.

An object of this invention is to provide improved alumina-dominated phosphors having increased light output under cathode ray excitation.

Another object of this invention is to provide improved methods of preparation of alumina-dominated phosphors.

A further object is to provide improved luminescent screens and improved cathode ray tubes and luminescent means including the improved phosphors of the invention.

In general, the invention includes a new family of activated alumina-dominated phosphors having arsenic incorporated therein. The phosphors of the invention exhibit a greater light output when excited with cathode rays than similar phosphors without arsenic.

A method according to the invention comprises reacting an intimate mixture comprising alumina, an activator and arsenic as an oxide in an oxidizing atmosphere at a temperature below the melting point of the reaction product.

A luminescent screen according to the invention comprises a substrate having a coating thereon including at least one of the phosphors of the invention. Such luminescent screens may comprise a coating of a single composition for producing monochrome light images. For producing polychrome light images, the luminescent screen may comprise a multiplicity of groups of discrete phosphor areas in predetermined order of cyclic succession, said groups including an area comprising a phosphor of the invention.

A cathode ray tube according to the invention, comprises an envelope, a cathode ray gun within one portion of said envelope, and a luminescent screen of the invention in another portion of said envelope, said luminescent screen being adapted to be excited by cathode rays from said gun.

The foregoing objects and other advantages will be more completely described by reference to the accompanying drawing in which.

Example 1.—Slurry a mixture comprising one mol of aluminum oxide, 0.001 mol of $Cr_2O_3$ and 0.5 mol of $As_2O_3$ in water. Mill the slurry for about 16 hours to obtain intimate mixing of the ingredients, dry at about 125° C. and fire for about one hour at about 1200° C. in air in a quartz crucible. Cool the fired product, mill in water to provide a fine particle size, and then dry at about 125° C. The composition of the fired product calculated from the composition of the initial mixture is $Al_2O_3:0.5As_2O_3:0.001Cr_2O_3$.

Figure 1:
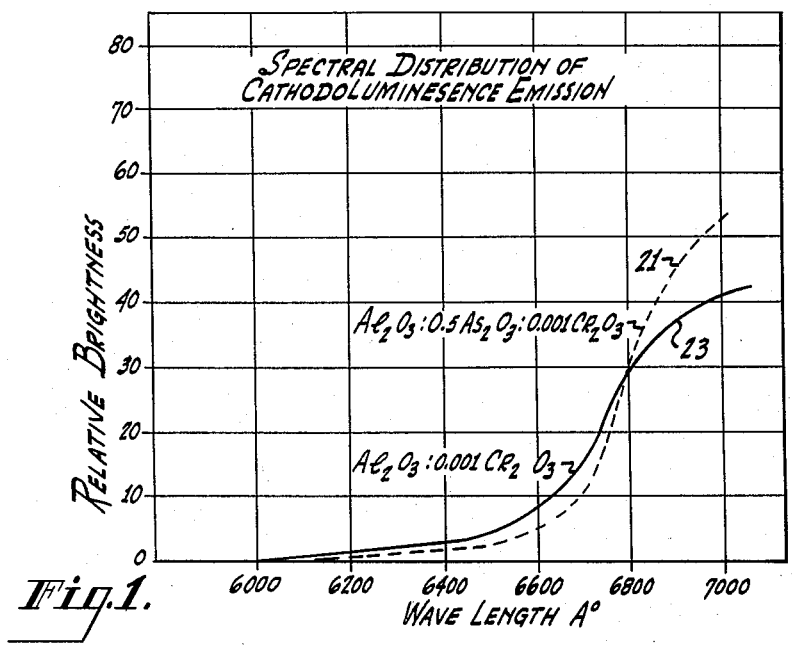
Figure 1 is a curve illustrating the spectral distribution of the emission of a phosphor of the invention when excited with cathode rays.

Referring to Figure 1, the spectral distribution of the emission in the visible region of the spectrum of the phosphor of Example 1 when excited with cathode rays is shown by dash-line curve 21. The spectral distribution of the emission of a similar phosphor prepared without arsenic, and similarly excited, is shown by the solid-line curve 23. The light output in the red portion of the spectrum of the phosphor of Example 1 prepared with arsenic and excited with cathode rays is at least 30% greater than the corresponding composition prepared without arsenic.

Example 2.—Slurry a mixture comprising 1.0 mol of BeO, 1.0 mol of $Al_2O_3$, 0.002 mol of $Cr_2O_3$ and 0.5 mol of $As_2O_3$ in water. Mill the slurry for about 16 hours to obtain intimate mixing of the ingredients, dry at 125° C. and then fire for one hour at about 1250° C. in air in a quartz crucible. Cool the fired material, mill in water to provide a fine particle size, and then dry at about 125° C. The composition of the fired product calculated from the composition of the initial mixture is $$BeO \cdot Al_2O_3:0.5As_2O_3:0.002Cr_2O_3$$

However, the light output of the phosphor of Example 2 is at least 30% greater than a similar phosphor prepared without arsenic. The color of emission is red.

Example 3.—Slurry a mixture comprising 1.0 mol of MgO, 1.0 mol of $Al_2O_3$, 0.002 mol of $Cr_2O_3$ and 0.5 mol of $As_2O_3$ in water. Mill the slurry to obtain intimate mixing of the ingredients, dry at about 125° C., and then fire at about 1250° C. for about one hour in a quartz crucible in air. Cool the fired product, mill to obtain a fine particle size and then dry at about 125° C. The composition of the fired product of Example 3 calculated from the composition of the initial mixture is $$MgO \cdot Al_2O_3:0.5As_2O_3:0.002Cr_2O_3$$

The light output of the phosphor of Example 3 under cathode ray excitation is at least 50% greater than a corresponding composition prepared without arsenic. The color of emission is red.

Arsenic may be used to intensify the light emission from any alumina-dominated phosphor. Such phosphor may be an activated alumina or an activated aluminate of a metal. It is preferred to intensify phosphors whose host crystals comprise an aluminate of a metal of group II of the periodic table, for example, beryllium, magnesium, calcium and barium. The alumina-dominated phosphors which are improved in light output by the inclusion of arsenic may be activated with manganese, chromium, gallium, iron, silver and cerium, for example. Arsenic may be added to the batch as any oxide of arsenic or any salt of arsenic which yields an oxide of arsenic upon heating in air. However, it is preferred to add arsenic as $As_2O_3$ or as $As_2O_5$. Arsenic may be added in activator proportions or in proportions up to 200 mol percent with respect to the host crystal of the phosphor. The batch is preferably fired at a temperature between 800° C. and 1300° C. However, the batch may be fired at any temperature below the melting point of the phosphor and sufficiently high to recrystallize the host crystal material and to incorporate the activator therein. The raw batch is preferably fired in an oxidizing atmosphere although a neutral atmosphere may be used in many cases. Analysis of the fired product indicates that substantially all of the arsenic of the raw batch is incorporated in the fired product.

The ingredients for preparing the phosphors of the invention are discussed as oxides and may be introduced into the raw batch as raw oxides. However, the ingredients may also be introduced as compounds of the various metals which yield oxides of these metals upon heating in air. Thus, for example, one may use carbonates, nitrates, acetates, hydroxides, hydrates or oxalates of these metals. The ingredients are preferably non-volatile at elevated temperatures and of the highest purity.

*Example 4.*—A preferred green-emitting phosphor that is particularly useful in color television may be prepared by the following method. Slurry a mixture of 0.45 mol of ZnO, 0.50 mol of $Al_2O_3$ as aluminum hydroxide, 0.06 mol of $As_2O_5$ and 0.01 mol of manganese as manganous sulfate in distilled water. Mill the slurry to obtain intimate mixing of ingredients, dry at 160° C., and then fire at about 1100° C. in air for about 1 hour. Cool the fired product, mill in carbon tetrachloride to provide a fine particle size and then dry at about 125° C. The composition of the fired product calculated from the composition of the raw batch is

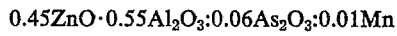

$0.45ZnO \cdot 0.55Al_2O_3 : 0.06As_2O_3 : 0.01Mn$

The light output of the phosphor of Example 4 under cathode ray excitation is at least twice as great as a corresponding composition prepared without arsenic.

The preferred green-emitting manganese activated zinc aluminate compositions may be expressed by the following molecular formula: $aZnO \cdot bAl_2O_3 : cAs : dMn$ wherein $a$ is between 0.41 and 0.49, $b$ is between 0.59 and 0.51, $c$ is between 0 and 0.12, $d$ is between 0.001 and 0.05 and $a+b$ equals 1.

Figure 2:
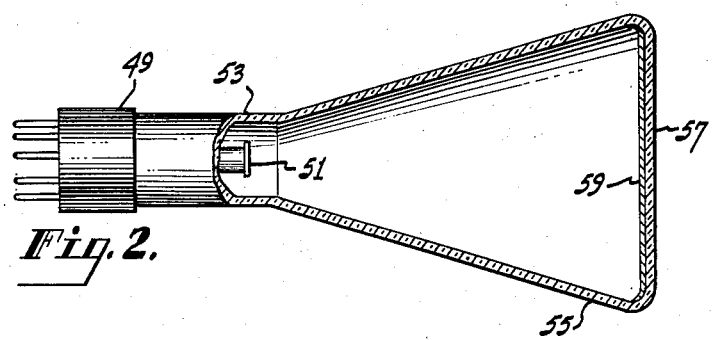
Figure 2 is a partially-sectional, elevational view of a cathode ray tube having a luminescent screen on the faceplate thereof including a phosphor of the invention.

Referring to Figure 2, cathode ray tubes according to the invention may include a luminescent screen comprising a substrate having a coating therein comprising a phosphor of the invention. The cathode ray tube may comprise a tube base 49 including a cathode ray gun 51, a glass envelope comprising a neck portion 53, a conical portion 55 and a faceplate 57. A thin layer 59 of a composition including a phosphor of the invention is disposed on the inner surface of the faceplate 57. A thin layer 59 on the faceplate 57 is referred to as the luminescent screen. The thin layer 59 may comprise a uniform composition throughout or may comprise a plurality of discrete areas comprising a phosphor of the invention. Where the thin layer 59 comprises a uniform composition, the cathode ray tube is referred to as having a monochrome screen. Where the luminescent screen comprises a plurality of areas having phosphors of different emission color characteristics, the luminescent screen is referred to as a polychrome screen.

Figure 3:
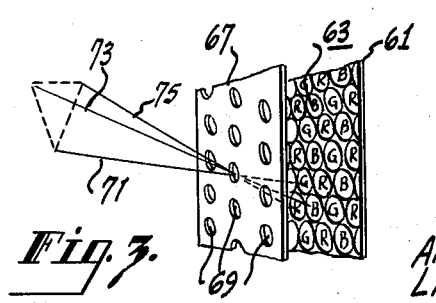
Figure 3 is a fragmentary exploded view of one type of polychrome luminescent screen having a shadow mask associated therewith.

Referring to Figure 3, there is shown one form of tri-color kinescope screen, which is a type of polychrome screen. The screen comprises a transparent glass base plate 61 having arranged on one side thereof a coating 63 comprising a multiplicity of closely spaced circular phosphor areas or dot trios. Each trio includes a dot "R" of a red-emitting phosphor, such as copper-activated zinc-cadmium selenide. Each trio further includes a dot "B" of a blue-emitting phosphor which may comprise a silver-activated zinc sulfide. Each trio further includes a dot "G" of a green-emitting phosphor such as described in Example 4. The centers of these three dots of each trio lie at the corners of an equilateral triangle. The centers of the trios themselves lie at the corners of equilateral triangles of larger size.

Spaced in front of the plate 61 is a shadow mask 67 provided with a multiplicity of holes 69, each hole 69 being associated with and spaced from a particular trio on the luminescent screen. The mask 67 and the coating 63 may be used in a kinescope having means for simultaneously projecting three electron beams, the axis of which are shown as dotted lines 71, 73 and 75. These beams are located 120° apart about the tube axis and are converged to a point at the plane of the mask 67. The convergence angle of the beams, the positioning of the mask 67 with respect to the base plate 61 and the arrangement of the holes 69 in the shadow mask with respect to the phosphor dot trios, all cooperate to scan each electron beam across the screen to excite only phosphor dots in each trio emitting light of one particular color.

The above-type of screen is only one of a number of different arrangements of polychrome luminescent screens. The general type is a screen which comprises discrete phosphor areas emitting light in each of three different colors, regardless of the particular shape of each of the areas and their specific geometrical arrangement on the screen, at least one of said areas comprising a phosphor of the invention. If intended for use in the usual type of television kinescope, the base plate should be of glass and the phosphor areas are normally disposed on one surface of the plate. If the screen is to be viewed by front surface light rather than transmitted back surface light, the base plate or at least its surface, may be an opaque material such as a ceramic, a glass or a metal. By base plate is meant in general, a substrate material on which the phosphor areas are disposed, whether the plate be planar or non-planar, whether it be a single member or a plurality of members and whether the phosphor areas be disposed on one side or more than one side thereof. Also included in the invention are tri-color luminescent means comprising three monochrome screens each having different light emission characteristics. The light emission from each of the screens is projected upon a single surface producing a composite color image. All of the luminescent screens comprise a general category of luminescent means having in common a combination of one or more phosphors of different emission characteristics, the emission of which is combined in such a way as to produce polychromatic images. The phosphors of the type described in Example 4 are useful in tri-color luminescent means for color television. They are especially useful when all three component phosphors of the luminescent means have a short persistence.

There have been described improved phosphors of the alumina family and improved methods of preparation thereof. By incorporating arsenic in alumina-dominated phosphors according to the invention, the phosphors exhibit an increased light output under cathode ray excitation. Such phosphors are useful in improved polychrome luminescent means and improved cathode ray tubes including the improved phosphors of the invention.

What is claimed is:

1. A phosphor consisting essentially of a host crystal selected from the group consisting of alumina, beryllium aluminate, magnesium aluminate, calcium aluminate, strontium aluminate, barium aluminate, zinc aluminate, and cadmium aluminate, an activator selected from the group consisting of manganese, chromium, gallium, iron, silver, and cerium, and between 0.1 and 200 mol percent with respect to said host crystal material of arsenic incorporated therein.

2. A phosphor consisting essentially of manganese-activated zinc aluminate having arsenic incorporated therein in proportions between 0.1 and 200 mol percent with respect to said zinc aluminate.

3. A phosphor consisting essentially of chromium-activated alumina having arsenic incorporated therein in proportions between 0.1 and 200 mol percent with respect to said alumina.

4. A phosphor consisting essentially of chromium-activated magnesium aluminate having arsenic incorporated therein in proportions between 0.1 and 200 mol percent with respect to said magnesium aluminate.

5. A phosphor consisting essentially of chromium-activated beryllium aluminate having arsenic incorporated therein in proportions between 0.1 and 200 mol percent with respect to said beryllium aluminate.

6. A method for preparing a luminescent material comprising firing a mixture compresing alumina, an activator selected from the group consisting of manganese, chromium, gallium, iron, silver, and cerium, and between 0.1 and 200 mol percent with respect to said alumina of arsenic, as a compound thereof, at a temperature between 800° C. and 1300° C. in an oxidizing atmosphere.

7. A method for preparing a luminescent aluminate comprising firing a mixture consisting essentially of alumina, an oxide of a metal selected from the group consisting of beryllium, magnesium, calcium, strontium, barium, zinc, and cadmium, an activator selected from the group consisting of manganese, chromium, gallium iron, silver, and cerium and between 0.1 and 200 mol percent with respect to said aluminate of arsenic, as an oxide, at a temperature between 800° C. and 1300° C. in an oxidizing atmosphere.

8. A luminescent screen comprising a substrate having a coating thereon including a phosphor consisting essentially of a host crystal selected from the group consisting of alumina, beryllium aluminate, magnesium aluminate, calcium aluminate, strontium aluminate, barium aluminate, zinc aluminate, and cadmium aluminate, an activator selected from the group consisting of manganese, chromium, gallium, iron, silver, and cerium and between 0.1 and 200 mol percent with respect to said host crystal of arsenic incorporated therein.

9. A luminescent screen comprising a substrate having a coating thereon including a phosphor consisting essentially of manganese-activated zinc aluminate having arsensic incorporated therein in proportions between 0.1 and 200 mol percent with respect to said host crystal.

10. A luminescent screen for color television comprising a base plate having disposed on a surface thereof a multiplicity of groups of discrete phosphor areas arranged in a predetermined order of cyclic succession, said groups including a green-emitting component consisting essentially of a manganese-activated zinc aluminate having arsenic incorporated therein in proportions between 0.1 and 200 mol percent with respect to said zinc aluminate.

11. Luminescent means for a color television reproducer comprising discrete areas of different phosphors, each phosphor area capable of emitting light in one of three different colors when excited, one of said phosphors consisting essentially of a manganese-activated zinc aluminate having arsenic incorporated therein in proportions between 0.1 and 200 mol percent with respect to said zinc aluminate.

12. A cathode ray tube comprising an envelope, a cathode ray gun within one portion of said envelope and a luminescent screen comprising a substrate having a coating thereon including a phosphor consisting essentially of a host crystal selected from the group consisting of alumina, beryllium aluminate, magnesium aluminate, calcium aluminate, strontium aluminate, barium aluminate, zinc aluminate, and cadmium aluminate, an activator selected from the group consisting of manganese, chromium, gallium, iron, silver and cerium, and between 0.1 and 200 mol percent with respect to said host crystal of arsenic incorporated therein within another portion of said envelope, said luminescent screen being adapted to be excited by cathode rays from said cathode ray gun.

13. A cathode ray tube comprising an envelope, a cathode ray gun within one portion of said envelope and, within another portion of said envelope, a luminescent screen comprising a substrate having a coating thereon including a phosphor consisting essentially of manganese-activated zinc aluminate having arsenic incorporated therein in proportions between 0.1 and 200 mol percent with respect to said zinc aluminate, said luminescent screen being adapted to be excited by cathode rays from said cathode ray gun.

14. A cathode ray tube comprising an envelope, a cathode ray gun within one portion of said envelope, and within another portion of said envelope, a luminescent screen comprising a base plate having disposed on a surface thereof a multiplicity of groups of discrete phosphor areas arranged in a predetermined order of cyclic succession, said groups including a green-emitting phosphor consisting essentially of a manganese-activated zinc aluminate having arsenic incorporated therein in proportions between 0.1 and 200 mol percent with respect to said zinc aluminate, said luminescent screen being adapted to be excited by cathode rays from said cathode ray gun.

References Cited in the file of this patent

UNITED STATES PATENTS

| | | |
|---|---|---|
| 2,116,167 | Espig | May 3, 1938 |
| 2,206,280 | Froelich | July 2, 1940 |
| 2,312,266 | Roberts | Feb. 23, 1942 |
| 2,392,814 | Froelich | Jan. 15, 1946 |
| 2,398,629 | Fonda | Apr. 16, 1946 |
| 2,523,026 | Jones | Sept. 19, 1950 |
| 2,580,073 | Burton | Dec. 25, 1951 |
| 2,590,411 | Isenberg | Mar. 25, 1952 |

OTHER REFERENCES

Jones: Journal of Electrochemical Society, vol. 95, No. 6, June 1948, pages 295–298.

"Some Aspects of Luminescence of Solids," by Kroger Elsevier Pub. Co., New York (1948), pp. 49–52, 262–270.